United States Patent [19]
Fujiwara

[11] Patent Number: 5,611,149
[45] Date of Patent: Mar. 18, 1997

[54] GAGE FOR USE IN WELDING

[75] Inventor: Yoshinori Fujiwara, Matsudo, Japan

[73] Assignee: Fuji Tool Co., Ltd., Chiba-ken, Japan

[21] Appl. No.: 521,471

[22] Filed: Aug. 30, 1995

[30] Foreign Application Priority Data

Sep. 12, 1994 [JP] Japan ............... 6-012372 U

[51] Int. Cl.⁶ .................................................. G01B 5/00
[52] U.S. Cl. ........................ 33/833; 33/534; 33/679.1
[58] Field of Search ......................... 33/679.1, 832, 33/833, 834, 548, 806, 534, 538, 555.1, 544.4

[56] References Cited

U.S. PATENT DOCUMENTS

| | | | |
|---|---|---|---|
| 2,389,842 | 11/1945 | Cummins | 33/833 |
| 2,603,872 | 7/1952 | Jones | 33/555.1 |
| 2,640,273 | 6/1953 | Larson et al. | 33/679.1 |
| 2,720,707 | 10/1955 | Bickley | 33/833 |
| 2,959,861 | 11/1960 | Stromquist | 33/534 |
| 3,137,946 | 6/1964 | Kawabata | 33/679.1 |
| 4,485,558 | 12/1984 | Lycan et al. | 33/833 |
| 4,545,124 | 10/1985 | Brooks | 33/833 |
| 4,637,142 | 1/1987 | Baker | 33/833 |
| 5,337,489 | 8/1994 | Mustafa | 33/534 |

FOREIGN PATENT DOCUMENTS

| | | | |
|---|---|---|---|
| 532684 | 2/1958 | Belgium | 33/833 |
| 626967 | 3/1936 | Germany | 33/833 |
| 5134 | 2/1970 | Japan | 33/833 |
| 68436 | 10/1944 | Sweden | 33/833 |
| 203464 | 6/1939 | Switzerland | 33/833 |
| 439319 | 12/1935 | United Kingdom | 33/833 |

*Primary Examiner*—Thomas B. Will
*Attorney, Agent, or Firm*—Pearne, Gordon, McCoy & Granger

[57] ABSTRACT

A weld gage includes a gage body having a front gage plate and a back gage plate disposed in parallel facing relation to the front gage plate with a gap formed therebetween. The front gage plate has at least one kind of metric graduations provided at prescribed positions on an outer surface thereof, whereas the back gage plate has inch graduations at positions corresponding to the positions of the metric graduations of the front gage plate on an outer surface thereof. A slide scale is disposed between the front gage plate and the back gage plate for sliding movement. An angle-measuring plate is pivotally disposed between the front gage plate and the back gage plate.

17 Claims, 6 Drawing Sheets

5,611,149

GAGE FOR USE IN WELDING

BACKGROUND OF THE INVENTION

1. Field of the Invention

This invention relates to a weld gage which is used to measure weld beads, mainly in several welding work or in the construction work, in particular, of ships, bridges, and steel frames.

2. Background Art

As depicted in FIGS. 3 and 4, a conventional weld gage includes a stainless steel gage board 31 about 3 mm thick having main metric graduations 32 formed longitudinally on a back side of a front face, and angle graduations 33 formed longitudinally, on a back side of a back face. A slide groove 34 is formed in the back face of the gage board 31 so as to extend longitudinally at a transversely central position thereof, and metric graduations are longitudinally provided on a foreside of the slide groove 34. Thus, a slide scale 36 is slidably inserted in the slide groove 34 of the gage board 31, and is held in position by means of a retaining bolt 37 and a retaining nut 38. The bolt 37 is inserted into the gage board 31 from the back side thereof, while the nut 38, which is provided with a locking coil spring, is disposed at the front side of the gage board 31 to engage with the bolt 37. Furthermore, an L-shaped root-opening measuring plate 40 is provided on the front face of the gage board 31. Metric root-opening graduations 39 are provided longitudinally on an elongated distal portion, and the root-opening measuring plate 40 is secured to the left corner of the front face of the gage board 31 so as to be pivotable in the forward and backward direction with its proximal end being anchored by a retaining screw 41 and a locking coil spring.

In welding work, such as welding of a general type, welding for construction, shipbuilding, or bridgework, or welding of steel frames, when measuring a butt weld bead, a fillet weld bead, a throat depth, a diameter of a round bar, a difference in level or a plate thickness, a suitable lateral side of the gage board 31 is first brought into abutment with an object being welded in a horizontal or vertical fashion. Then, the retaining nut 38 associated with the retaining bolt 37 is loosened, and the slide scale 36 is slid in the right or left direction along the slide groove 34 to bring it into contact with the top of the butt weld, the fillet weld, the round bar, the planar plate or the like. The butt weld bead, the fillet weld bead, the throat depth, the diameter of a round bar, the difference in level or the plate thickness can be thus measured by reading the slide graduation 35 indicated by the reference graduation 42 provided on the slide scale 36. Similarly, when measuring a pre-processing groove angle, a suitable lateral end of the gage board 31 is brought into abutment with an object being welded. The retaining nut 38 associated with the retaining bolt 37 is then loosened, and the slide scale 36 is released from the slide groove 34 to be pivoted obliquely to be brought into contact with the inclined surface of the object to be welded. The groove angle can be thus measured by reading the angle graduation 33 indicated by the reference graduation 42 indicates. Furthermore, when measuring various root-openings, the retaining screw 41 is loosened to pivot the root-opening measuring plate 40. Then, the distal portion of the root-opening measuring plate 40 is inserted into the various root-openings of the object to be welded. Thus, by reading the root-opening graduations 39 formed on the front face of the root-opening measuring plate 40, the various root-openings can be measured.

However, when measuring the butt weld bead, the fillet weld bead, the throat depth, the diameter of a round bar, the difference in level or the plate thickness, the retaining nut 38 combined to the retaining bolt 37 must be released to move the slide scale 36 along the slide groove 34 in the right or left direction. Also, when measuring the pre-processing groove angle, the retaining nut 38 combined to the retaining bolt 37 must be loosened to release the slide scale 36 from the slide groove 34 and to pivot it obliquely. Thus, the operation of the slide scale 36 and the root-opening measuring plate 40 is laborious. In addition, the main graduations 32, the angle graduations 33 and the slide graduations 35 on the front or back face of the gage board 31, and the root-opening graduations 39 on the front face of the root-opening measuring plate 40 are graduated only in metric units. Thus, it is impossible to measure in inches. Moreover, the slide groove 34 is formed at the center of the thick stainless steel gage board 31 so as to extend longitudinally, and the slide scale 36 is inserted into the slide groove 34 for sliding movement in a longitudinal direction and held by means of the retaining bolt 37 and the retaining nut 38 with a locking coil spring. In addition, the root-opening measuring plate 40 is supported on the left corner of the front face of the gage board 31 by means of the retaining screw 41 and the coil spring. Therefore, the conventional weld gage is so intricate in structure that it is not suitable for mass production, and becomes expensive.

SUMMARY OF THE INVENTION

It is therefore the object of this invention to provide a novel weld gage, by which not only the height, the size or the like of various weld beads can be measured in precision by extremely easy procedures, but also a pre-processing groove angle, a parallel shaped root-opening, a V-shaped root-opening, a diameter of a round bar, a difference in level, a plate thickness and the like can be measured in precision. Another object of this invention is to provide a weld gage which can be used to measure the aforesaid dimensions either in metric unit or in inches, and which can be suitably mass-produced at a reduced cost.

According to a primary aspect of the present invention, there is provided a weld gage which includes a gage body including a front gage plate and a back gage plate disposed in parallel facing relation to the from gage plate with a gap formed therebetween, the front gage plate having at least one kind of metric graduations provided at prescribed positions on an outer surface thereof, whereas the back gage plate has inch graduations at positions corresponding to the positions of the metric graduations of the front gage plate on an outer surface thereof; a slide scale disposed between the front gage plate and the back gage plate for sliding movement; and an angle-measuring plate pivotally disposed between the front gage plate and the back gage plate. The graduations each gage plate may include main graduations and slide graduations for measuring dimensions representative of weld bead height, the angle-measuring plate having metric and inch graduations respectively provided on a front and back surface thereof for measuring dimensions representative of root-openings. The slide scale may be constructed to be slidable along the slide graduations, and includes a scale pointer provided thereon for pointing to the slide graduations. Each of the gage plates of the gage body may include an elongated opening extending along the slide graduations and formed to make the scale pointer visible therethrough.

The gage may include a pair of guide pins attached to the gage body so as to be held in rolling contact with the slide scale to guide the sliding movement of the slide scale. The slide scale includes an elongated aperture formed so as to extend in the sliding direction thereof, and a pair of slide stoppers disposed in spaced relation to each other in the sliding direction and attached to the gage body so as to be able to abut respective ends of the elongated aperture to stop the slide scale. The gage body may include a recess at a lateral end portion to define lateral ends having lateral faces perpendicular to the sliding direction of the slide scale, the slide scale including a first longitudinal end portion having a planar end face parallel to the lateral faces of the gage body and a second longitudinal end portion defining a right angle portion. The first longitudinal end portion of the slide scale may be constructed to be reduced in width. The front and back gage plates may be of a general rectangular shape, the gage body including four connecting members coupling the front and back gage plates at four corners of the gage plates. Each of the gage plates may have angle graduations provided thereon, the angle-measuring plate being disposed so as to be pivotal along the angle graduations, and including an angle pointer provided thereon for pointing to the angle graduations. Each of the gage plates of the gage body may include an arcuate opening extending along the angle graduations and formed to make the angle pointer visible therethrough. The front and back gage plates of the gage body may include notches formed therein for permitting withdrawal of the angle-measuring plate accommodated between the front and back gage plates.

In the weld gage as constructed above, when performing general welding, welding in construction or shipbuilding, or welding of bridgework or steel frames, the slide scale is slid or the angle-measuring plate is pivoted, and the heights or sizes of various weld beads such as butt weld beads or a fillet weld beads are measured by reading the slide graduations. In addition, a pre-processing groove angle, a parallel shaped root-opening, a V-shaped root-opening, a diameter of a round bar, a difference in level or a plate thickness can be measured by reading the main graduations, the slide graduations, the angle graduations or the root-opening graduations.

Furthermore, in taking the measurements, the pair of slide stoppers stop the movement of the slide scale by blocking its progress when either end of the elongated aperture reaches a given position, and the slide scale is slid while being guided by a pair of guide pins. The slide graduations indicated by the scale pointer of the slide scale can be read through the elongated openings.

DESCRIPTION OF THE PREFERRED EMBODIMENTS OF THE INVENTION

Figure 1:
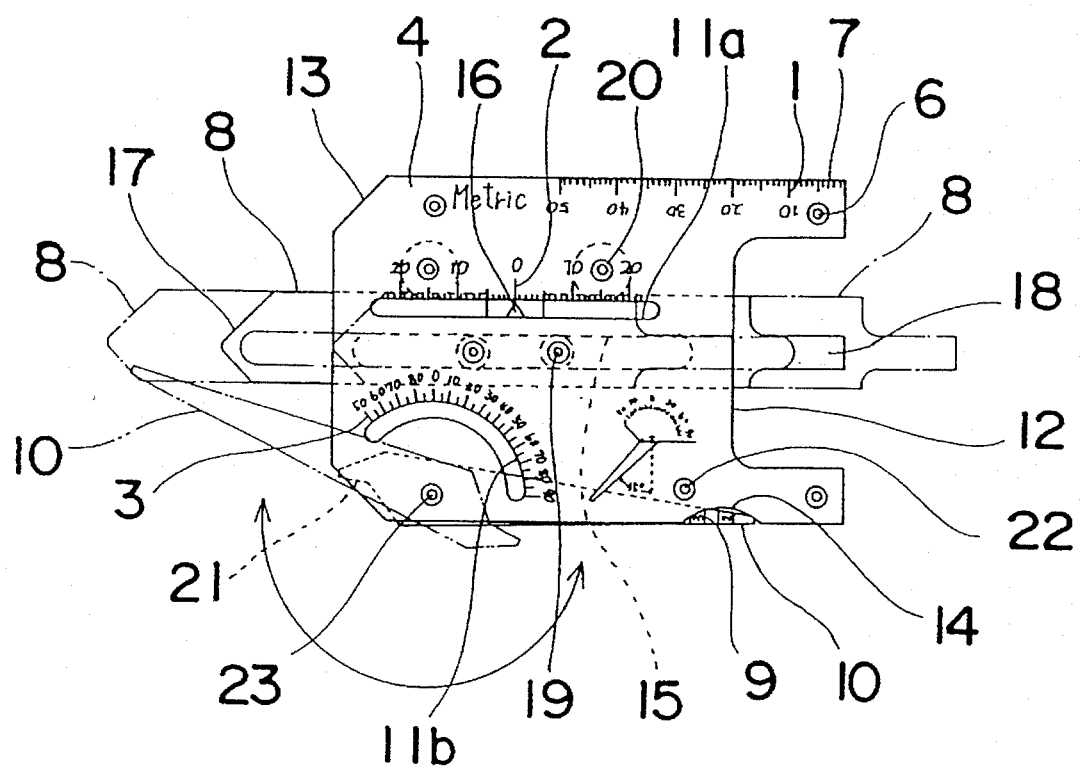
FIG. 1 is a from elevational view of a weld gage in accordance with an embodiment of the present invention.
Figure 2:
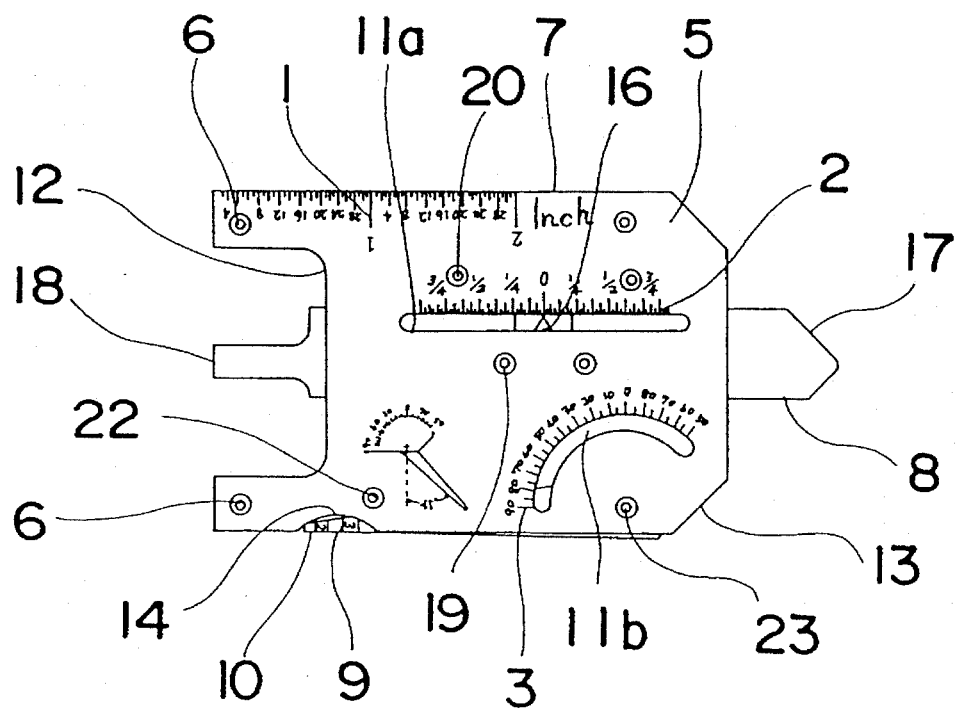
FIG. 2 is a back view of the weld gage of FIG. 1.
Figure 3:
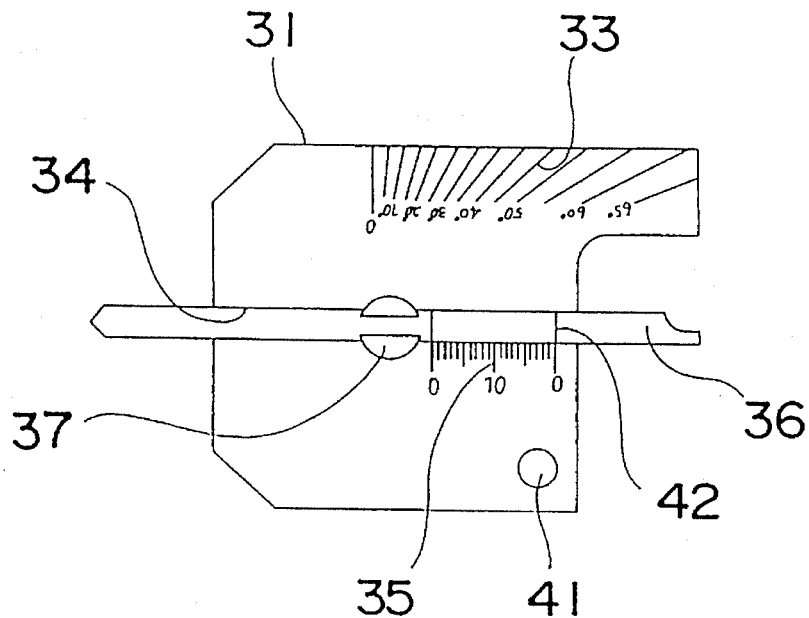
FIG. 3 is a front elevational view of a conventional weld gage.
Figure 4:
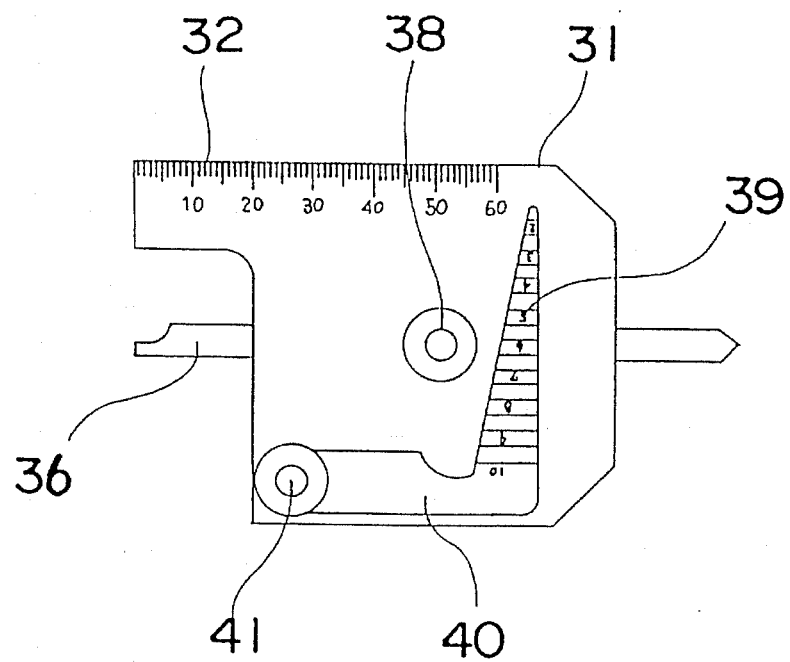
FIG. 4 is a back view of the weld gage of FIG. 3.

As depicted in FIGS. 1 and 2, the weld gage according to the invention includes a gage body 7 having a front gage plate 4 and a back gage plate 5, coupled together at four corners thereof by means of short connecting pins 6 with suitable spacing formed therebetween. Both the front gage plate 4 and the back gage plate 5 have main graduations 1, slide graduations 2 and angle graduations 3. The main graduations 1 and the slide graduations 2 on the front gage plate 4 are provided in metric units, whereas those on the back gage plate 5 are provided in inch units. The angle graduations 3 are provided in degrees on both the front gage plate 4 and the back gage plate 5. A slide scale 8, for measuring a butt weld bead A, a fillet weld bead B, a throat depth, a height and size of a fillet weld bead B, a diameter of a round bar C, a difference in level and a plate thickness, is inserted into the space between the front gage plate 4 and the back gage plate 5 so as to be adjacent to the slide graduations 2, such that it can slide along the slide graduations 2. Furthermore, an angle-measuring plate 10 with root-opening graduations 9 for measuring a pre-processing groove angle D, a parallel shaped root-opening E, a V-shaped root-opening F, a single-bevel shaped root-opening G, and the like, is inserted into the space between the front gage plate 4 and the back gage plate 5 so as to be adjacent to the angle graduations 3, and is supported so as to be pivotable along the angle graduations 3.

More specifically, the gage body 7 comprises the front gage plate 4 used for measurement in metric units and the back gage plate 5 used for measurement in inches, each of which is formed from a rectangular stainless steel plate of about 1 mm thick having identical size. The front gage plate 4 and the back gage plate 5 each has the main graduations 1 formed on the rear edge of a respective outer face thereof, and the slide graduations 2 provided linearly in the longitudinal direction on the transversely central position of the outer face thereof. An elongated opening 11a is formed in each of the plates so as to extend along the lower side of the slide graduations 2. In addition, the angle graduations 3, which are arcuately shaped, are provided on the outer face of a respective plate so as to be located at a left and foreside corner thereof, and an arcuately-shaped opening 11b is formed so as to extend along the lower side of the angle graduations 3. Furthermore, a measuring portion 12 for measuring with the slide scale 8 is formed on the right end of each of the plates, a pair of inclined faces 13 with inclination angles of 45 degrees are formed at both the left corners, and notches 14 are formed at the lower right ends of the plates for pulling the angle-measuring plate 10. The front gage plate 4 and the back gage plate 5 are thus coupled together at four corners by means of short connecting pins 6 so as to define a suitable space therebetween. In the foregoing, the main graduations 1, the slide graduations 2 and the angle graduations 3 on the front gage plate 4 are naturally indicated in metric units, while those on the back gage plate 5 are indicated in inches.

The slide scale 8 is formed of a narrow rectangular stainless steel plate about 1 mm thick, and has an elongated aperture 15 of a suitable length formed longitudinally at a center thereof, a scale pointer 16 formed at the upper side of the longitudinally central portion thereof for pointing to the slide graduations 2 through the elongated opening 11a, a right angle portion 17 formed on the left end thereof for measuring a right angle, and a reduced-width portion 18 formed on the right end thereof for measuring a butt weld bead A, a diameter of a round bar C and a plate thickness H. The slide scale 8 is inserted between the front gage plate 4 and the back gage plate 5 of the gage body 7 near the slide graduations 2 so as to slide in a longitudinal direction (or in a front and back direction). A pair of slide stoppers 19 are arranged between the front gage plate 4 and the back gage plate 5 near the elongated opening 11a to stop the movement of the slide scale 8 by blocking its progress when either end of the elongated aperture 15 abuts the slide stoppers 19 at a prescribed position. In the drawings, the numeral 20 denotes a pair of guide pins attached at a suitable interval between the front gage plate 4 and the back gage plate 5 for guiding the sliding movement of the slide scale 8.

Furthermore, the angle-measuring plate 10 is formed of a stainless steel plate about 1 mm thick having a width tapering towards a tip end, and root-opening graduations 9 for measuring various openings such as a parallel-shaped root-opening E, a V-shaped root-opening F, or a single-bevel shaped root-opening formed in metric system on the front side thereof, whereas root-opening graduations 9 are provided in inches on the back side thereof. Attached to the angle-measuring plate 10 at a proximal portion thereof is an angle pointer 21 which can point to the prescribed graduations of the angle graduations 3 through the arcuate opening 11b. The angle-measuring plate 10 is disposed at a corner of the gage body 7 adjacent to the angle graduations 3, and is pivotally attached to the front gage plate 4 and the back gage plate 5 by means of a pivot pin 23 such that the angle-measuring plate 10 is stopped when its distal end contacts a pivot stopper 22, which is attached to the front gage plate 4 and the back gage plate 5 and located above the notches 14. In the foregoing, the root-opening graduations 9 are provided in metric units and in inches on the front and back sides of the angle-measuring plate 10, respectively.

Figure 5:
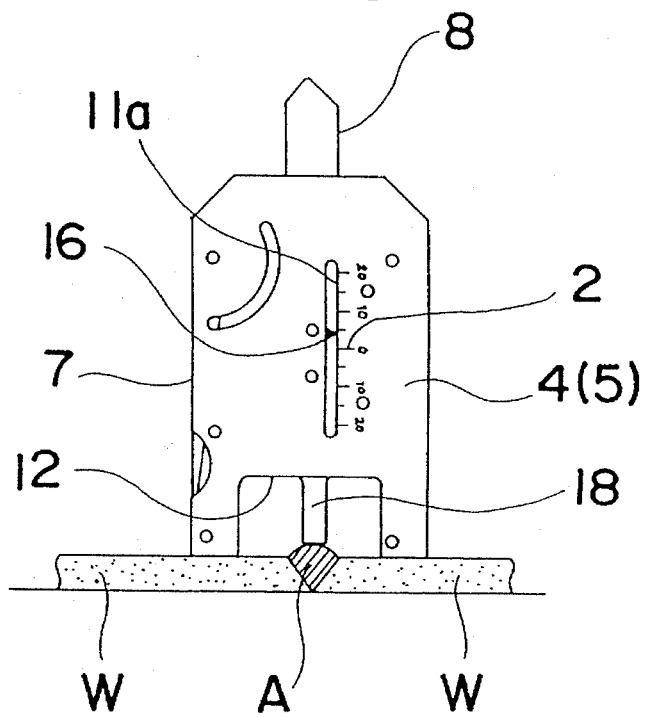
FIG. 5 is a view showing how to measure a butt weld bead using the weld gage of the present invention.
Figure 6:
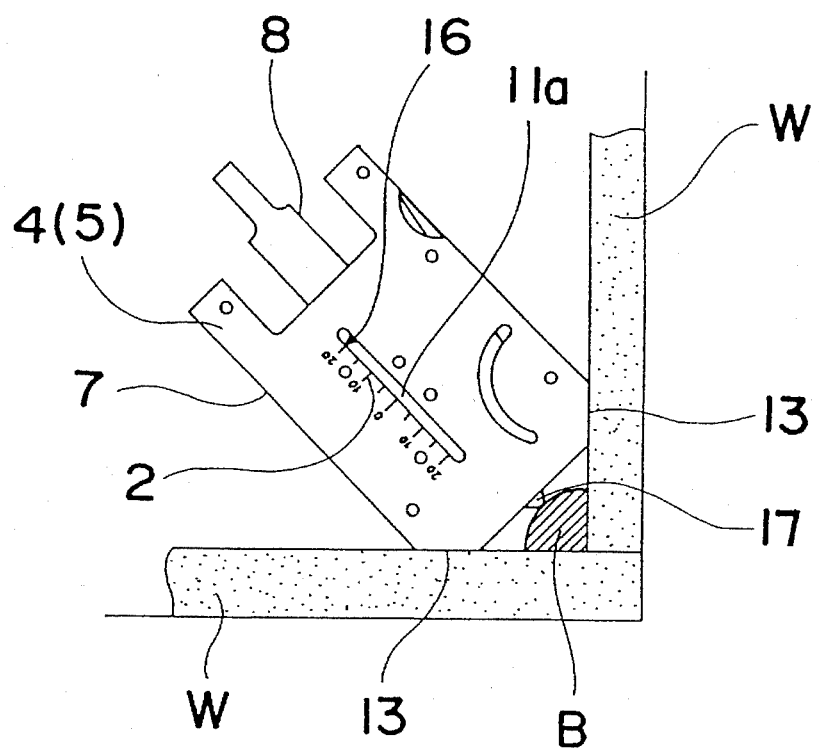
FIG. 6 is a view similar to FIG. 5, but showing how to measure a throat depth.
Figure 7:
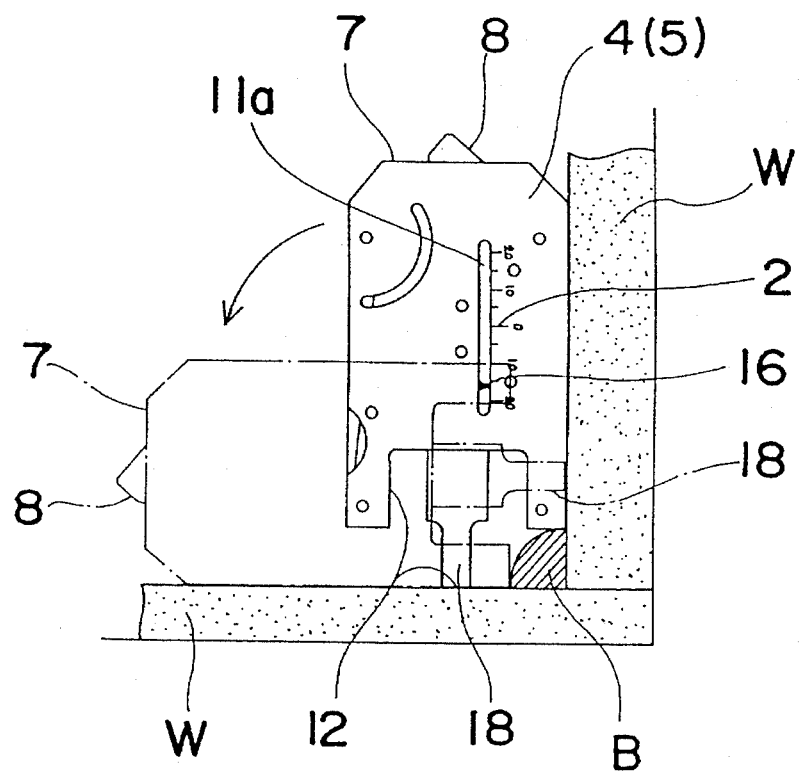
FIG. 7 is a view similar to FIG. 5, but showing how to measure a fillet weld bead size (leg length)

Next, the usage of the weld gage according to this invention will be explained. As shown in FIG. 5, when measuring the butt weld bead A during general welding, welding in construction or shipbuilding, or welding of bridgework or steel frames, the lateral end of the measuring portion 12 of the gage body 7 is brought into contact with objects W being welded horizontally. The slide scale 8 is then slid to bring the end of the reduced-width portion 18 into abutment with the top of the butt weld bead A. Then, the slide graduations 2 pointed to by the scale pointer 16 of the slide scale 8 are read through the elongated opening 11a. Thus, the height of the butt weld bead A can be measured in either metric units or in inches. Similarly, as shown in FIG. 6, when measuring a fillet weld bead B and a throat depth, the respective inclined faces 13 of the gage body 7 are brought into abutment with the horizontal portion and the vertical portion of the welded object W, respectively. The slide scale 8 is then slid to bring the right angle portion 17 into abutment with the top of the fillet weld bead B, and the slide graduations 2 indicated by the scale pointer 16 of the slide scale 8 are read through the elongated opening 11a. Thus, the height of the fillet weld bead B and the throat depth can be measured in either metric units or in inches. In the same way, as shown in FIG. 7, when measuring the size of the fillet weld bead B (leg length), the end of the measuring portion 12 of the gage body 7 is brought into abutment with the top or side of the fillet weld bead B. The slide scale 8 is then slid to bring the end of the reduced-width portion 18 into abutment with the horizontal side or the vertical side of the objects which have been welded to form a right angle. Then, the slide graduations 2 indicated by the slide pointer 16 of the slide scale 8 are read through the elongated opening 11a. Thus, the size of the fillet weld bead B (leg length) can be measured in either metric units or in inches.

Figure 8:
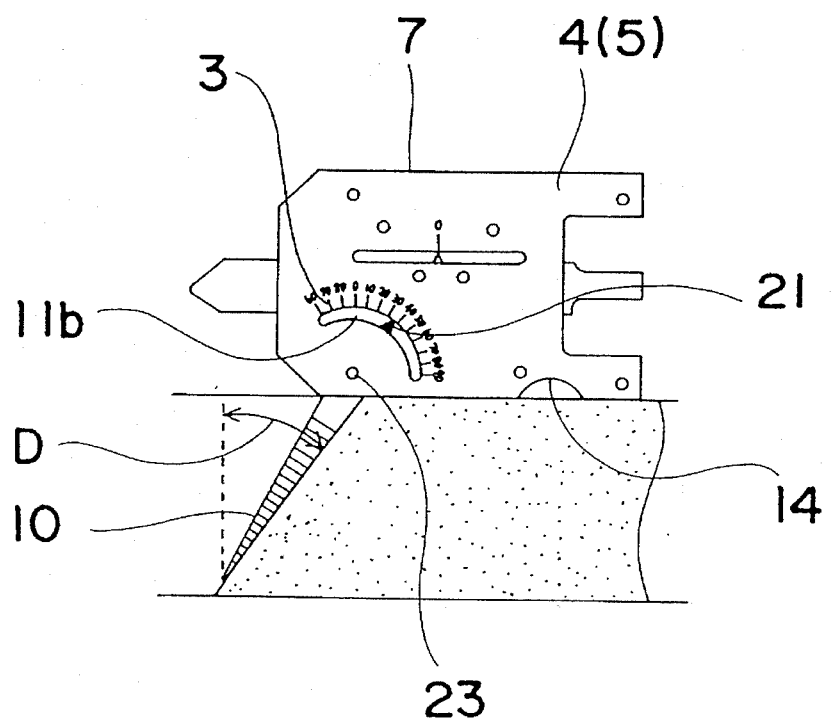
FIG. 8 is a view showing how to measure a pre-processing groove angle using the weld gage of the present invention.
Figure 9:
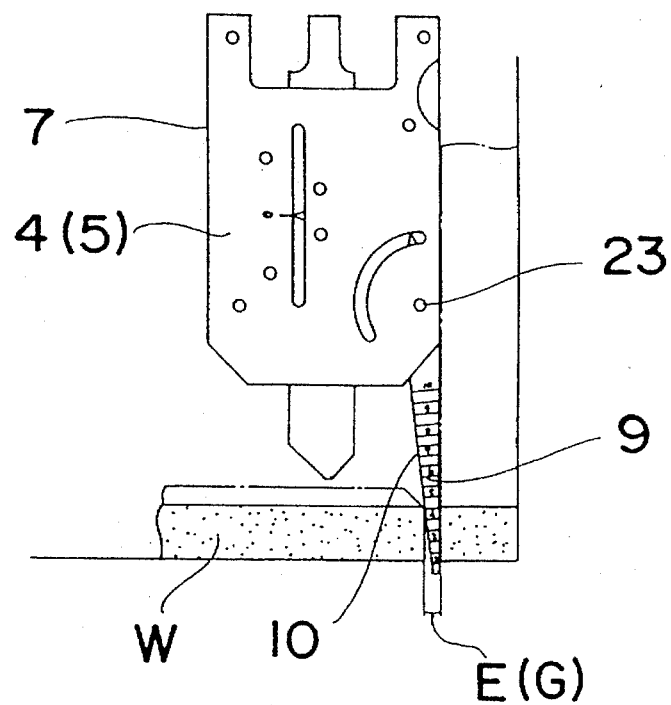
FIG. 9 is a view showing how to measure various root-openings such as a parallel shaped root-opening, using the weld gage of the present invention.
Figure 10:
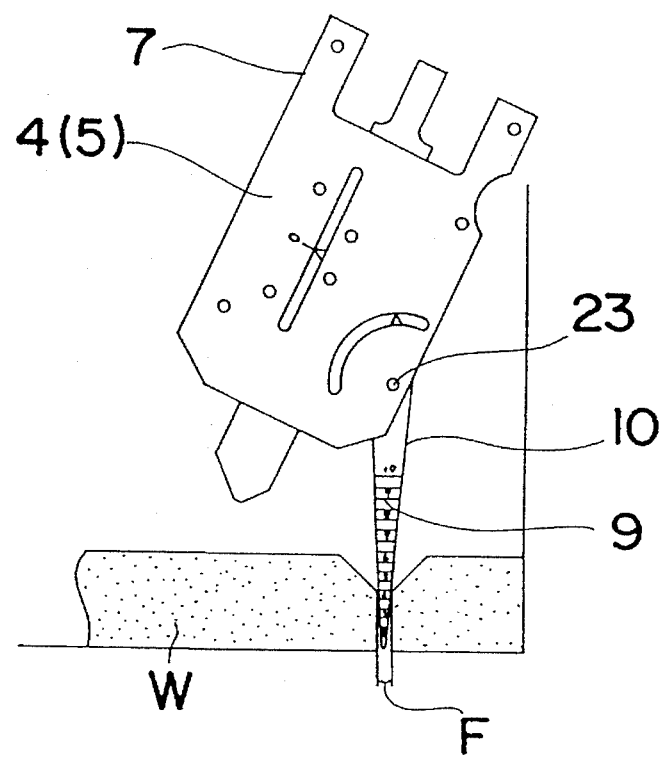
FIG. 10 is a view showing how to measure a V-shaped root-opening, using the weld gage of the present invention.

Furthermore, as shown in FIG. 8, when measuring a pre-processing groove angle D, the fore side of the gage body 7, which has the angle-measuring plate 10 and the notches 14, is brought into abutment with the upper surface of the object W being welded. The angle-measuring plate 10 is then pivoted about the pivot pin 23 to be brought into abutment with the inclined face of the pre-processing object, and the angle graduations 3 indicated by the angle pointer 21 of the angle-measuring plate 10 are read through the arcuate opening 11b. Thus, the pre-processing groove angle D can be measured in either metric units or in inches. In the same way, as shown in FIGS. 9 and 10, when measuring a parallel shaped root-opening E, a V-shaped root-opening F, a single-bevel shaped root-opening G or the like, the angle-measuring plate 10 is pivoted about the pivot pin 23 to insert the distal end portion of the angle-measuring plate 10 into the aforesaid root-openings. Thus, by reading the root-opening graduations 9 formed on the front or back side of the angle-measuring plate 10, a parallel shaped root-opening E, a V-shaped root-opening F and the like can be measured in either metric units or in inches.

Figure 11:
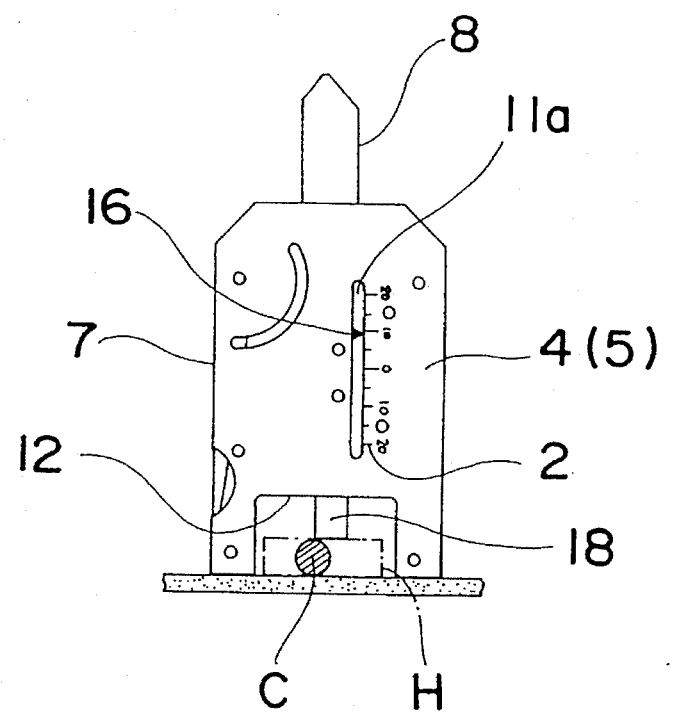
FIG. 11 is a view showing how to measure a diameter of a round bar and a difference in level and a plate thickness, using the weld gage of the present invention.
Figure 12:
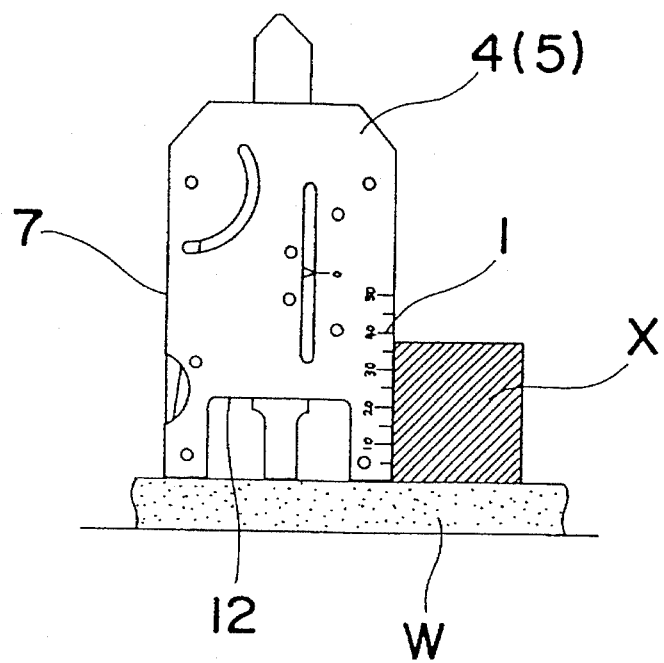
FIG. 12 is a view showing how to measure a plate thickness and height, using the weld gage of the present invention.

Moreover, as shown in FIG. 11, when measuring a diameter of a round bar C, a difference in level or a plate thickness, the lateral end of the measuring portion 12 of the gage body 7 is brought into abutment with the horizontal object W to be welded. The slide scale 8 is then slid to bring the edge of the reduced-width portion 18 into abutment with the top of the round bar C or the plate H. Then, by reading the slide graduations 2 indicated by the scale pointer 16 of the slide scale 8 through the elongated opening 11a, a diameter of the round bar C, a difference in level or a plate thickness can be measured in either metric units or in inches. In the same way, as shown in FIG. 12, when measuring a thickness of a plate or a height thereof, the lateral end of the measuring portion 12 of the gage body 7 is brought into abutment with the horizontal object W to bring that side of the gage body 7 including the main graduations 1 into abutment with the side face of an object X to be measured. Thus, by reading the main graduations 1 pointed to by the top of the object X, the thickness or the height of the object X can be measured in either metric units or in inches.

When performing general welding, welding in construction or shipbuilding, or welding of bridgework or steel flames, by simple operations such as sliding the slide scale 8 or pivoting the angle-measuring plate 10, the height and size of various weld beads such as a butt weld bead A or a fillet weld bead B can be measured precisely. Furthermore, by reading the main graduations 1 of the gage body 7, the slide graduations 2 of the slide scale 8, the angle graduations 3 or the root-opening graduations 9 of the angle-measuring plate 10, a pre-processing groove angle D, a parallel shaped root-opening E, a V-shaped root-opening F, a diameter of a round bar C, a difference in level or a plate thickness also can be measured precisely.

The outer face of the front gage plate 4 of the gage body 7 has main graduations 1, slide graduations 2 and angle graduations 3 provided in metric units, whereas the outer face of the back gage plate 5 of the gage body 7 has main graduations 1, slide graduations 2 and angle graduations 3 graduated in inches. Thus, measuring can be performed either in metric units or in inches.

The weld gage according to this invention has a slide scale 8 slidably inserted into a suitable position between the front gage plate 4 and the back gage plate 5, and an angle-measuring plate 10 pivotally attached at a suitable position between the front gage plate 4 and the back gage plate 5 of the gage body 7. In contrast, in the case of a conventional weld gage, the slide groove 34 must be formed in the back face of the gage board 31 so as to extend longitudinally at a transversely central position thereof. The slide scale 36 must be slidably inserted into the slide groove 34 of the gage board 31, and is held in position by means of a retaining bolt 37 and a retaining nut 38. The bolt 37 is inserted into the gage board 31 from the back side thereof, while the nut 38, which is provided with a locking coil spring, is disposed at the front side of the gage board 31 to engage with the bolt 37. The root-opening measuring plate 40 must be secured to the left corner of the front face of the gage board 31 so as to be pivotable in the forward and backward directions with its proximal end being anchored by a retaining screw 41 and a locking coil spring. Accordingly, the structure of the weld gage according to the present invention is simpler than the conventional structure, so the weld gage according to the present invention can be mass-produced at a reduced cost.

The welding gage according to this invention includes an elongated opening 11a formed in each of the front gage plate 4 and the back gage plate 5 so as to extend along the lower side of the slide graduations 2. A slide scale 8 having an elongated aperture 15 of suitable length and a scale pointer 16 which points to the slide graduations 2 through the elongated openings 11a is inserted in the space between the front gage plate 4 and the back gage plate 5 so as to be adjacent to the slide graduations 2. A pair of slide stoppers 19 are attached at a suitable underbill between the front gage plate 4 and the back gage plate 5 near the elongated opening 11a to stop the movement of the slide scale 8 by blocking its progress when either end of the elongated aperture 15 abuts the slide stoppers 19 at a given position. The slide scale 8 is guided by a pair of guide pins 20 attached at a suitable interval between the front gage plate 4 and the back gage plate 5 near the slide graduations 2.

Accordingly, in performing of general welding, welding for construction or shipbuilding, or welding of bridgework or steel frames, when measuring the height, the size or the like of various weld beads such as a butt weld bead A or a fillet weld bead B, and a pre-processing groove angle D, a parallel shaped root-opening E, a V-shaped root-opening F, a diameter of a round bar C, a difference in level or a plate thickness, the slide stoppers 19 stop the movement of the slide scale 8 by blocking its progress when either end of the elongated aperture reaches a given position. Additionally, the slide scale 8 is guided by a pair of guide pins 20 of the gage body 7. Therefore, not only can the slide scale 8 be slid smoothly and precisely, but the slide graduations 2 pointed to by the pointer 16 of the slide scale 8 can be read through the elongated opening 11a. Thus, the height, the size or the like of various weld beads such as a butt weld bead A or a fillet weld bead B, and a diameter of a round bar C, a difference in level or a plate thickness can be measured precisely.

Finally, the present application claims the priority of Japanese Utility-Model Application No. 6-012372, filed Sep. 12, 1994, which is herein incorporated by reference.

What is claimed is:

1. A gage for use in welding comprising:

a gage body including a front gage plate and a back gage plate disposed in parallel facing relation to said front gage plate with a gap formed therebetween, said front gage plate having slide metric graduations formed on an outer surface thereof so as to extend in a prescribed direction, whereas said back gage plate has slide inch graduations formed on an outer surface thereof and disposed at positions corresponding to the positions of said metric graduations of said front gage plate; and a slide scale disposed slidably along said slide graduations between said front gage plate and said back gage plate, said slide scale including scale pointer means provided thereon for pointing to said slide graduations, wherein each of said gage plates includes an elongated opening extending along said slide graduations, and said scale pointer means is visible through said elongated opening.

2. A gage according to claim 1, wherein each of said front gage plate and said back gage plate further include angle graduations formed on a corner of said outer surface thereof, said gage further comprising:

an angle-measuring plate pivotally disposed between said front gage plate and said back gage plate at the corner where said angle graduations are formed, said angle-measuring plate including an angle pointer for pointing to said angle graduations, wherein each of said gage plates includes an arcuately-shaped opening extending along said angle graduations, and said angle pointer is visible through said arcuately-shaped opening.

3. A gage according to claim 2, wherein one of said front gage plate and said back gage plate has main metric graduations formed on an edge of said outer surface thereof, and the other of said front gage plate and said back gage plate has main inch graduations formed on an edge of said outer surface thereof and disposed at positions corresponding to the positions of said main metric graduations of said one gage plate.

4. A gage according to claim 3, wherein said angle-measuring plate has metric and inch graduations respectively provided on front and back surfaces thereof for measuring dimensions representative of root-openings.

5. A gage according to claim 4, further comprising a pair of guide pins attached to said gage body so as to be held in rolling contact with said slide scale to guide the sliding movement of said slide scale.

6. A gage according to claim 5, wherein said slide scale includes an elongated aperture formed so as to extend in a sliding direction thereof, and a pair of slide stoppers disposed in spaced relation to each other in said sliding direction and attached to said gage body so as to be able to abut a respective end of said elongated aperture to stop said slide scale.

7. A gage according to claim 6, wherein said gage body includes a recess at a lateral end portion to define lateral ends having lateral faces perpendicular to said sliding direction of said slide scale, said slide scale including a first longitudinal end portion having planar end face parallel to said lateral faces of said gage body and a second longitudinal end portion defining a pair of inclined faces with inclination angles of 45 degrees.

8. A gage according to claim 7, wherein said first longitudinal end portion of said slide scale is constructed to be reduced in width.

9. A gage according to claim 8, wherein said front and back gage plates are of a generally rectangular shape, said gage body including four connecting members coupling said front and back gage plates at four corners of the gage plates.

10. A gage according to claim 9, wherein said front and back gage plates of said gage body include notches formed therein for permitting withdrawal of said angle-measuring plate accommodated between said front and back gage plates.

11. A gage for use in welding comprising:

a gage body including a front gage plate and a back gage plate, said back gage plate being disposed in parallel facing relation to said front gage plate and spaced from said front gage plate so as to form a gap between said front and back gage plates, an outer surface of said front gage plate having metric graduations provided thereon at prescribed positions, an outer surface of said back gage plate having inch graduations thereon at positions corresponding to the prescribed positions of said metric graduations on said front gage plate, and the outer surfaces of said front and back gage plates having angle graduations formed thereon;

a slide scale disposed between said front gage plate and said back gage plate, said slide scale being slidably movable along said slide graduations; and an angle-measuring plate pivotally disposed between said front gage plate and said back gage plate, said angle-measuring plate being movable along said angle graduations.

12. A gage according to claim 11, wherein said angle gradations are formed at a corner of said outer surfaces of said front and back gage plates, and said angle-measuring plate is pivotally disposed at the corner where said angle graduations are formed, said angle-measuring plate including an angle pointer for pointing to said angle graduations.

13. A gage according to claim 12, wherein each of said gage plates includes an arcuately-shaped opening extending along said angle graduations, and said angle pointer is visible through said arcuately-shaped opening.

14. A gage according to claim 11, wherein said slide scale includes a slide scale pointer means for pointing to said slide graduations.

15. A gage according to claim 14, wherein each of said gage plates includes an elongated opening extending along said slide graduations, and said slide scale pointer means is visible through said elongated opening.

16. A gage according to claim 15, wherein said angle graduations are formed at a corner of said outer surfaces of said front and back gage plates, and said angle-measuring plate is pivotally disposed at the corner where said angle graduations are formed, said angle-measuring plate including an angle pointer for pointing to said angle graduations.

17. A gage according to claim 16, wherein each of said gage plates includes an arcuately-shaped opening extending along said angle graduations, and said angle pointer is visible through said arcuately-shaped opening.

* * * * *

UNITED STATES PATENT AND TRADEMARK OFFICE
CERTIFICATE OF CORRECTION

PATENT NO. : 5,611,149
DATED : March 18, 1997
INVENTOR(S) : Fujiwara

It is certified that error appears in the above-indentified patent and that said Letters Patent is hereby corrected as shown below:

Column 2, line 23, delete "comer" and insert --corner--; and line 45, delete "from" and insert --front--.

Column 3, line 16, delete "comers" and insert --corners--; and line 59, delete "from" and insert --front--.

Column 4, line 16, delete "comers" and insert --corners--.

Column 5, line 34, delete "comer" and insert --corner--.

Column 6, line 54, delete "flames" and insert --frames--.

Column 7, line 22, delete "comer" and insert --corner--.

Column 9, line 4 (Claim 9, line 4), delete "comer" and insert --corner--.

UNITED STATES PATENT AND TRADEMARK OFFICE
CERTIFICATE OF CORRECTION

PATENT NO. : 5,611,149
DATED : March 18, 1997
INVENTOR(S) : Fujiwara

It is certified that error appears in the above-indentified patent and that said Letters Patent is hereby corrected as shown below:

Column 10, line 2 (Claim 12, line 2), delete "gradations" and insert --graduations--; and line 19 (Claim 16, line 2), delete "gradations" and insert --graduations--.

Signed and Sealed this

Twenty-sixth Day of August, 1997

Attest:

BRUCE LEHMAN

Attesting Officer

Commissioner of Patents and Trademarks